United States Patent [19]

Walker

[11] Patent Number: 4,496,172

[45] Date of Patent: Jan. 29, 1985

[54] SUBSEA WELLHEAD CONNECTORS

[75] Inventor: James M. Walker, Houston, Tex.

[73] Assignee: Dril-Quip, Inc., Houston, Tex.

[21] Appl. No.: 438,601

[22] Filed: Nov. 2, 1982

[51] Int. Cl.³ .............................. F16L 55/00; F16L 37/00; F16L 39/00
[52] U.S. Cl. .................................... 285/18; 285/315; 285/321; 285/398; 285/419
[58] Field of Search ................. 285/18, 315, 398, 321, 285/419, 373

[56] References Cited

U.S. PATENT DOCUMENTS 4,114,928  9/1978  Lochte ................................ 285/18
4,169,507 10/1979  Szymczak ..................... 285/315 X

FOREIGN PATENT DOCUMENTS 2101522  2/1983  United Kingdom .
2104170  3/1983  United Kingdom .

OTHER PUBLICATIONS

Composite Catalog of Oil Field Equipment and Services, 1980-81, p. 1469, 1980, p. 7206.

Primary Examiner—Richard J. Scanlan, Jr.
Attorney, Agent, or Firm—Vaden, Eickenroht, Thompson, Bednar & Jamison

[57] ABSTRACT

There is disclosed a remotely operable, subsea wellhead connector for connecting the lower end of one wellhead member to the upper end of another wellhead member which is mounted in an upright position beneath the water surface, such connector including a tubular member adapted to be connected to the lower end of the one wellhead member so that it may be lowered therewith into end-to-end relation with the lower wellhead member, and a split lock ring having upper and lower locking teeth carried by the tubular member for radial movement together between an expanded position in which the upper teeth are generally opposite and spaced from grooves about the tubular member and the lower teeth are movable past the upper end of the lower wellhead member for disposal opposite and spaced from grooves thereabout, and a contracted position in which the upper and lower teeth thereof are in locking engagement with the grooves in the tubular member and lower wellhead member, respectively, when the tubular member has been lowered in end-to-end relation with the lower wellhead member. The lock ring assumes either its expanded or its contracted positions when unstressed, and a ring surrounds the lock ring for movement between a first position in which the lock ring is expanded and a second position in which the cam ring is slidable over follower means on the lock ring to wedge it into contracted position. The cam ring is moved between its first and second positions by a plurality of remotely operable, extendible and retractible actuators arranged about the cam ring and connected at their opposite ends to the tubular member and the cam ring.

37 Claims, 7 Drawing Figures

SUBSEA WELLHEAD CONNECTORS

This invention relates to improvements in remotely operable apparatus for releasably connecting subsea wellhead members to one another in end-to-end relation.

This application is related to my copending application, Ser. No. 438,575 filed concurrently herewith, and entitled "Apparatus for Releasably Connecting Tubular Members in End-to-End Relation".

In the drilling and/or producing of an offshore well, it's necessary to connect and disconnect various wellhead members a substantial distance beneath the water surface. For example, as the well is drilled, the lower end of a blowout preventer stack must be connected to and then disconnected from the upper end of a wellhead member attached to a well casing at the ocean floor, and the lower end of a riser must subsequently be connected to the upper end of the stack; and in completing the well, the lower end of a subsea Christmas Tree must be connected to the upper end of a subsea wellhead. In these and other cases, the connector must be capable of being preloaded in order to contain fluid pressure under conditions of high structural loading.

In one type of subsea wellhead connector, shoulders on the upper ends of collet fingers are carried by a shoulder on a flange about the lower end of the upper wellhead member for pivoting between a first position in which their lower ends are free to move past a flange on the upper end of the lower wellhead member, as the upper wellhead member is lowered into end-to-end relation with the lower wellhead member, and a second position in which the shoulders on the lower ends of the collet finger move beneath a shoulder on the lower side of the flange of the lower wellhead member. More particularly, the shoulders on the flanges of the upper and lower wellhead members and on the collet fingers are tapered so that movement of the collet fingers into their second position urges opposite facing sealing surfaces on the ends of the wellhead members into tight engagement with one another in order to preload the connection.

The collet fingers are moved into their second, locking positions by means of a cam ring having a cam surface which slides downwardly over follower surfaces about the collet fingers. More particularly, the cam ring is so moved by the retraction of remotely operable, extendible and retractible actuators arranged about the cam ring and having their opposite ends connected to the cam ring and a flange on the lower end of a skirt which is carried by the upper wellhead member to surround the actuators. When the wellhead members are to be disconnected, the actuators are extended in order to lift the cam ring to permit the lower shoulders thereon to move out from engagement with the shoulder on the flange of the lower wellhead member. More particularly, the cam ring continues to move upwardly to engage an outwardly extending shoulder about the upper ends of the collet fingers so as to positively swing them outwardly to disconnecting position.

In the above-described connector, highly localized stresses are created since the load is transmitted through single load shoulders on each of the connector and wellhead member. Furthermore, even when the collet fingers are provided with multiple load surfaces, it is difficult to uniformly load each of them since they have to pivot about different arcs.

In another type of wellhead connector, dogs having multiple locking teeth are mounted on a lower flange of a skirt about the upper wellhead member for radial movement into and out of locking engagement with multiple locking grooves about the upper end of the lower wellhead member. More particularly, the locking dogs are moved into locking position by means of a cam ring having a cam surface thereabout slidable over follower surfaces about the dogs. Still further, fluid-operated, extendible and retractible actuators are connected to the cam ring and a flange about the lower end of a skirt surrounding the cam ring and the actuators, so that, upon retraction of the actuators, the cam ring is lowered to force the locking dogs into locking engagement with lower wellhead member, and, upon extension, the cam ring is raised to permit the locking dogs to be moved out of locking engagement.

Although the last described type of connector distributes the load to multiple load surfaces, these surfaces are located on only one of the members to be connected. Also, the load is transmitted from one wellhead member to the other through multiple parts and along an extended path which causes stress concentrations and complicates the overall construction of the connector. Furthermore, although a secondary fluid-operated system is provided for raising the cam ring, no means is provided for positively retracting the dogs out of locking engagement.

It is therefore a primary object of this invention to provide a remotely operable wellhead connector having the advantages, without the disadvantages, of each of the above-described types of connectors; and, more particularly, to provide such a connector in which the load is transmitted from multiple load shoulders on one such wellhead member to multiple load shoulders on the other such member in a direct path and through a minimum number of parts, and further in which the locking teeth and grooves on which the shoulders are formed are caused to move in a radial direction and thus to more uniformly distribute the load to each such shoulder.

A still further object is to provide a wellhead connector of the character above described which is adapted to be moved to its locked or its unlocked position in response to fluid under pressure, but which will remain in such position when the pressure fluid is exhausted.

These and other objects are accomplished, in accordance with the illustrated embodiments of the present invention, by a connector of the type above described which comprises a first tubular member adapted to be connected to the upper end of a first wellhead member mounted in an upright position beneath the water surface, and a second tubular member adapted to be connected to the lower end of a second wellhead member so that it may be lowered therewith in end-to-end relation with the first tubular member, the first tubular member having first locking grooves thereabout and the second tubular member having second locking grooves thereabout. The connector further includes a split lock ring having first and second locking teeth which are carried by the second or upper member for radial movement together between expanded positions in which the second teeth are generally opposite and spaced from the second grooves and in which the first teeth may be moved past the end of the first or lower member for disposal opposite and spaced from the second grooves, when such members are moved into end-to-end relation, and contracted positions in which the first and second teeth are in locking engagement with the first and second grooves, respectively. The teeth have tapered surfaces thereon which are slidable over tapered surfaces of the grooves to urge end surfaces on the tubular members into tight engagement with one another as the locking means moves to contracted position, and a cam ring arranged about the lock ring for movement between a first position in which the locking means is expanded and a second position in which the cam ring is slidable over follower means on the lock ring to wedge it into contracted position. More particularly, remotely operable, extendible and retractible actuators are arranged about the cam ring, and means are provided for connecting the opposite ends of the actuators to the upper tubular member and the cam ring for moving the cam ring between its upper and lower positions.

Thus, as will be understood, the locking parts are movable in a radial direction and distribute the load uniformly over multiple locking shoulders. More particularly, the load transmitted in a direct path is through the lock ring. Still further, the lock ring moves to expanded position merely in response to movement of the cam ring in a direction opposite that in which it is moved to wedge the lock ring into contracted position.

This invention contemplates that the lower tubular member adapted to be connected to the upstanding wellhead member, and to which the tubular member on the lower end of the upper wellhead member is to be connected, may be an integral part of the lower wellhead member, or, may have been installed upon and connected to another upper wellhead member by means of a connector of different construction, thereby rendering it unnecessary for the user of the apparatus to provide such a member. This invention further contemplates the lock ring may, if necessary to adopt the connector to an already installed lower wellhead member, be provided with second locking teeth adapted to be locked to grooves thereabout of a profile different from that of the grooves about the upper tubular wellhead member, regardless of their profile.

In the illustrated and preferred embodiments of the invention, a skirt is carried by the second tubular member to surround the actuators and has an inwardly extending flange on its lower end, and the opposite ends of the actuators are connected to the flange and bearing plate means extending laterally from the cam ring. More particularly, the inner diameter of the skirt flange is adapted to fit closely about the first tubular member, and the bottom side of the flange has a tapered surface adjacent its inner diameter to guide the lower end of the second tubular member into end-to-end relation with the upper end of the first tubular member.

As shown and described in the aforementioned related patent application, in one illustrated embodiment of the invention, the lock ring assumes its expanded position when unstressed, and, when so expanded, supports the cam ring in its first position, and the cam ring is slidable over the follower means on the lock ring as the cam ring moves from its first to its second position. More particularly, a dog is so mounted on the cam ring as to enter the split between the ends of the lock ring in order to spread them apart, as the cam ring moves into its first position, in the event the locking teeth had a tendency to stick to the locking grooves. Preferably the dog and lock ring have detent means engageable to releasably retain the dog in position between the split.

In another embodiment of the invention, the lock ring assumes its contracted position when unstressed, and the cam ring has means thereon for expanding the lock ring and holding it in expanded position as the cam ring moves to its first position. More particularly, the means for so expanding and holding the lock ring comprises a dog which, as in the first-described embodiment, is so arranged as to enter the split between the ends of the lock ring to wedge and hold them apart. In this embodiment, detent means are also provided on the dog and lock ring for retaining the dog between the split ends to prevent contraction of the lock ring. Thus, each of the two embodiments is made up of basically the same components, except for the body lock ring, which may be interchangeable between the two embodiments, depending on the shape which it is made to assume when unstressed.

Preferably, the follower means and cam are tapered at an angle which is less than the friction angle of the surfaces of the cam ring and lock ring, so that the cam ring normally holds the lock ring in its contracted, preloaded position. On the other hand, in the other embodiment, the lock ring is held in its stressed, expanded position by the disposal of the dog on the cam ring between the split ends of the lock ring. Thus, in either case, the lock ring will remain in the position to which it has been moved, so that when the motive force is fluid under pressure, it may be exhausted.

It is also preferred that the follower means and cam include axially successive, radially displaced surfaces, separated by a transition between them, whereby the lock ring can be moved to a maximum radial extent with a minimum of axial movement. In one embodiment of the invention, the locking teeth are formed on the inner surface of the lock ring. In another embodiment, the locking teeth are formed on locking segments or jaws mounted in circumferentially spaced apart relation about the lock ring.

In the drawings, wherein like reference characters are used throughout to designate like parts:

Figures 1, 2:
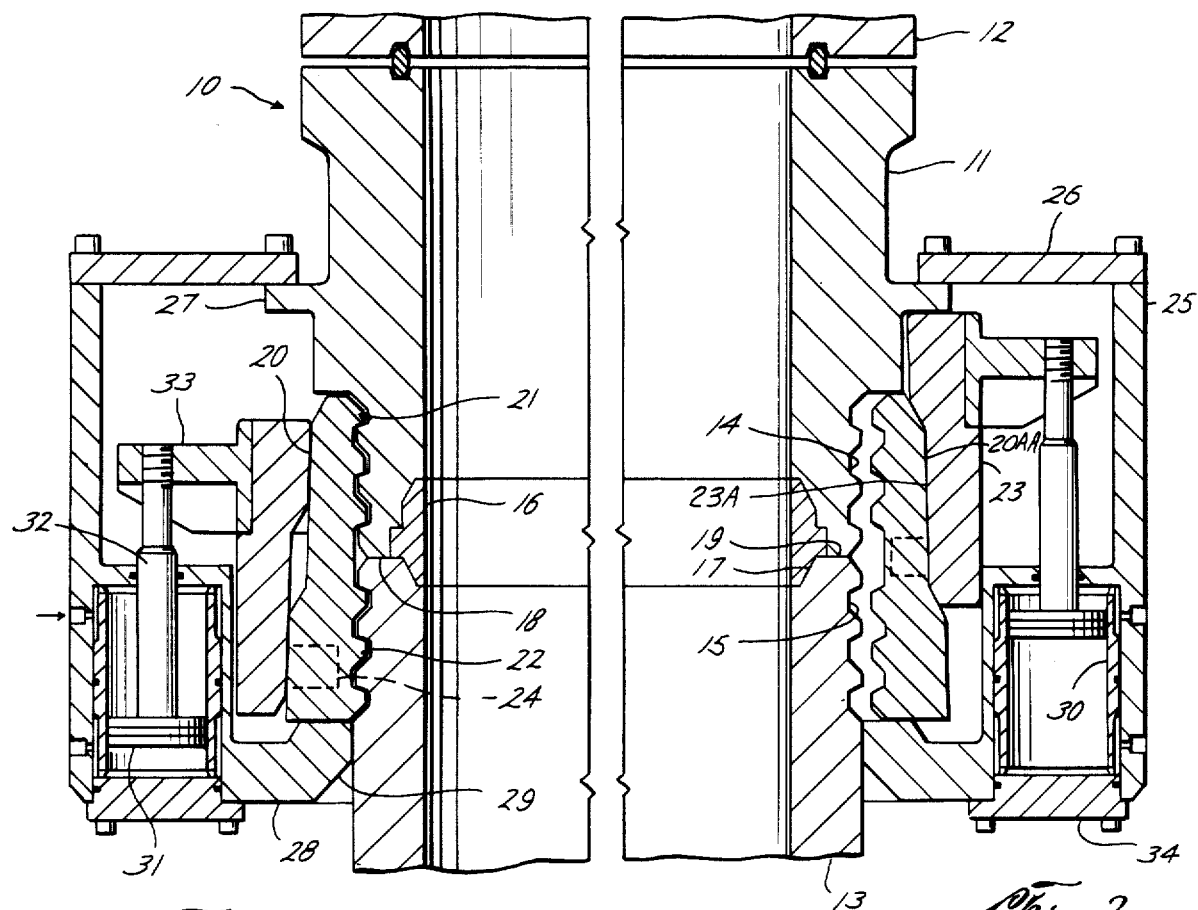
FIGS. 1 and 2 are vertical sectional views of a wellhead connector constructed in accordance with the first-described embodiment of the present invention, with FIG. 1 showing the left-hand side thereof in locked position, and FIG. 2 showing the right-hand side thereof in unlocked position.
Figures 4, 5:
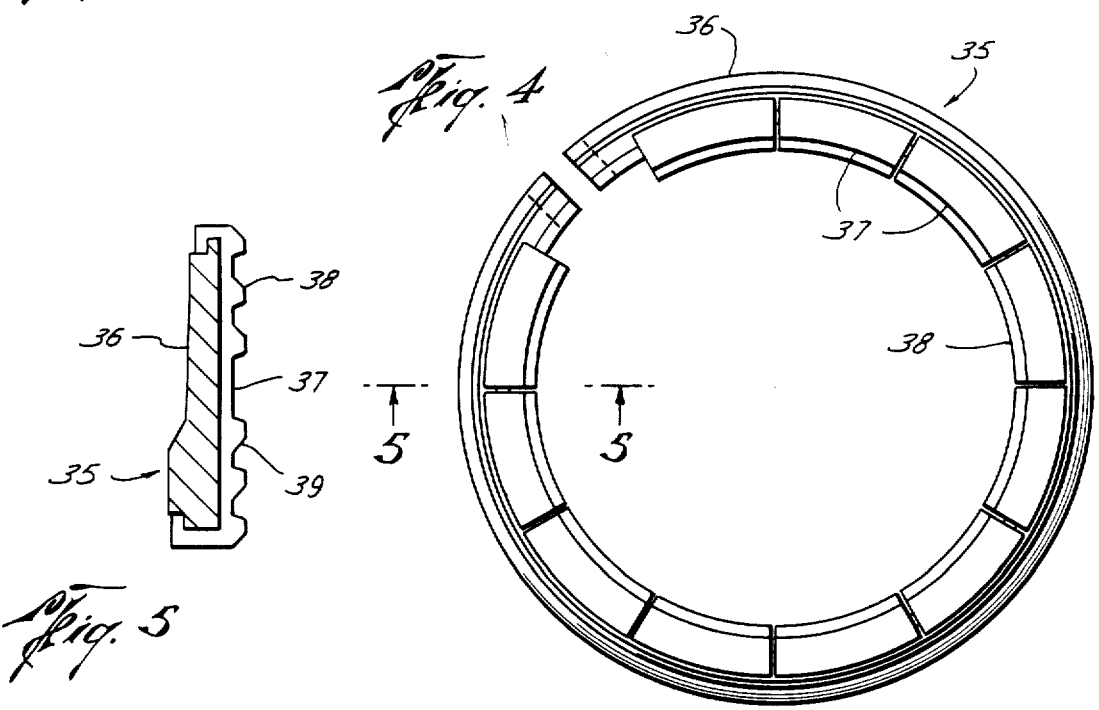
Figure 3:
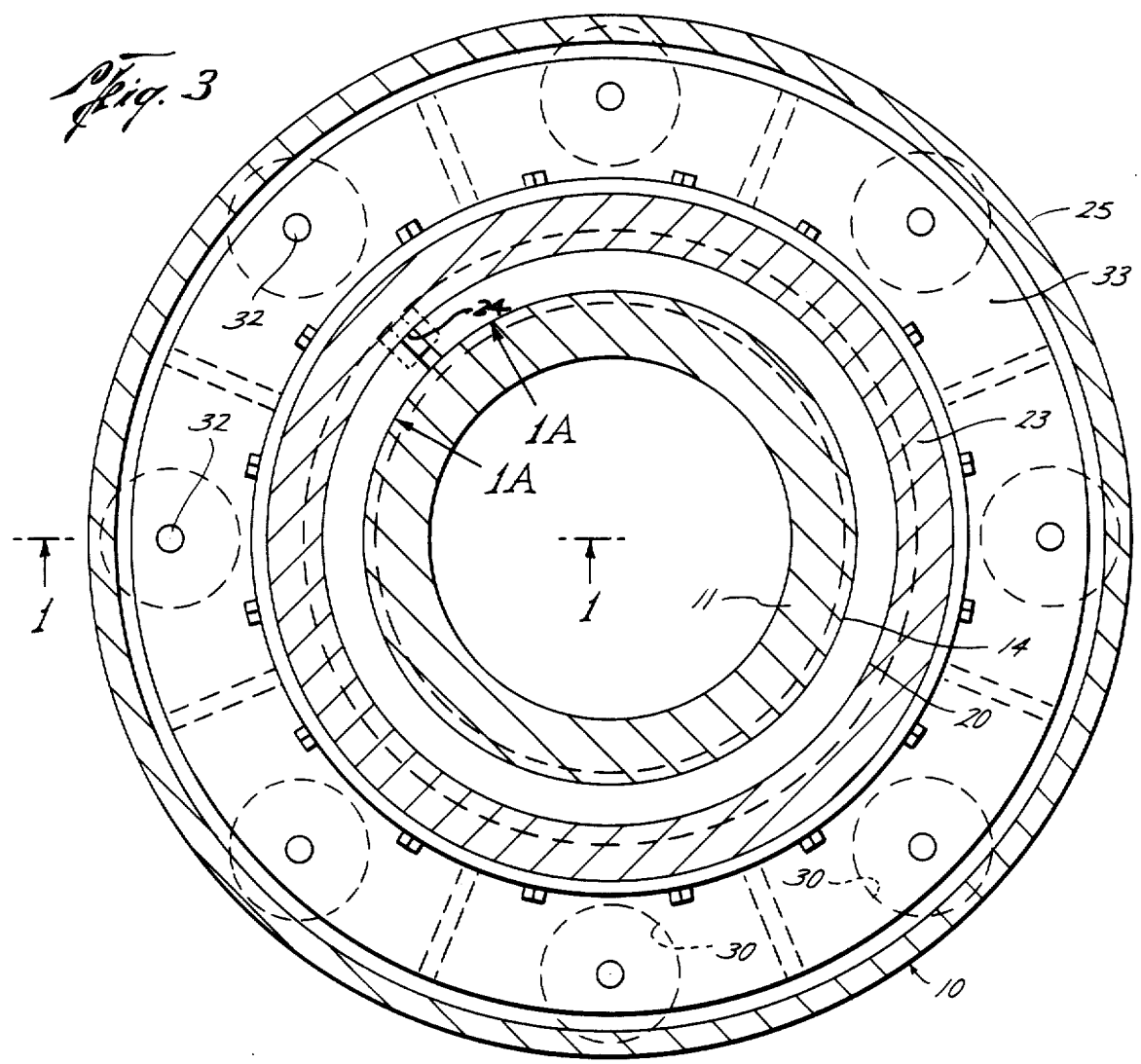
FIG. 3 is a horizontal sectional view of the connector in its locked position of FIG. 1.
Figure 1A:
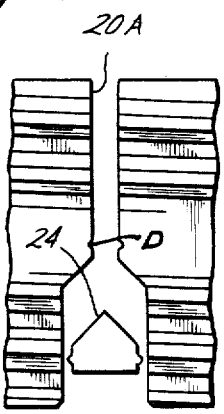
Figure 2A:
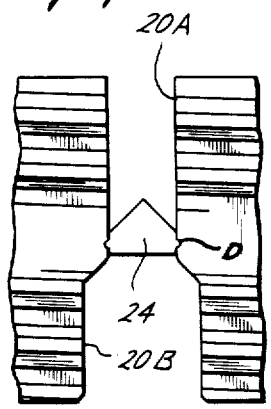

FIGS. 1A and 2A are detailed views of the split ends of the lock ring constructed in accordance with the embodiment thereof shown in FIGS. 1 to 3, as well as the dog carried by the cam ring, the dog and cam ring being shown in FIG. 1A in their lower positions upon contraction of the lock ring to locking position, and in FIG. 2A in their upper positions to move the dog between the ends of the locking ring in order to spread the lock ring to unlocking position in the event it is otherwise prevented from doing so;

FIG. 4 is a top plan view of locking means constructed in accordance with an alternative embodiment of the present invention, and shown in its unstressed expanded position; and FIG. 5 is a cross-sectional view of a portion of the lock ring of FIG. 4, as seen along broken lines 5—5 of FIG. 4.

With reference now to the details of the above-described drawings, the overall connector, which is indicated in its entirety by reference character 10, is shown to include a first tubular member 11 connected by any suitable means to the lower end of an upper wellhead member 12, and a lower tubular member 13 adapted to be connected to or forming an integral part of the upper end of a lower wellhead member attached to the upper end of a subsea well casing.

As previously mentioned, each of the tubular members is provided with locking grooves thereabout having profiles to receive locking teeth (to be described) on a split locking ring carried by the upper member 11. Thus, locking grooves 14 are formed about the lower end of tubular member 11, and locking grooves 15 are formed about the upper end of tubular member 13. Although these grooves on the two members are shown to be of the same profile, they may be of a different profile, and in fact, the number of grooves on each such member need not be the same.

A seal ring 16 carried by the lower end of the upper tubular member 11 has a flexible lip which is adapted to be received within an annular recess 17 in the upper end of tubular member 13 as such members are moved into end-to-end relation. More particularly, and as will be described in more detail to follow, the lip is flexed inwardly as it slides downwardly along the recess to form a seal therewith. Downward movement of member 11 continues until annular surface 18 on the lower end of the upper tubular member is forced downwardly into tight engagement with annular surface 19 on the upper end of the tubular member 13 in order to preload the connection.

As previously mentioned, a split lock ring 20 carried by the upper tubular member 11 has upper and lower axially spaced locking teeth 21 and 22 adapted to be moved together between an expanded unlocking position (FIG. 2) and a contracted position (FIG. 1) in locking engagement with the upper and lower locking grooves 14 and 15, respectively. Thus, a skirt 25 is carried by the upper tubular member 11 by means of a flange 26 on its upper end which is connected to an annular shoulder 27 about the upper tubular member, and a flange 28 extends inwardly from the lower end of the skirt to support the lower end of the lock ring for radial movement between its contracted and expanded positions.

As shown, the locking teeth and thus the grooves with which they are adapted to engage have tapered surfaces which are slidable over one another, as the lock ring moves to its contracted position, so as to pull the lower end of the upper tubular member 11 downwardly toward the upper end of lower member 13, whereby, as previously mentioned, the lip on the lower end of the upper tubular member is flexed inwardly and end surfaces 18 and 19 move into tight engagement with one another.

As previously described, in the illustrated embodiment of the invention, lock ring 20 is of such construction that, when unstressed, it assumes its expanded position in which its ends are spaced apart a maximum extent (FIG. 2A). More particularly, lock ring 20 is preferably fabricated from a solid ring having tooth profiles for fitting the locking grooves, the ring being then split and the split ends spread to cause it to be permanently deformed into its expanded position. The lock ring is adapted to be moved from its expanded position, as shown in FIG. 2, into its locking position, as shown in FIG. 1, by means of a cam ring 23 which surrounds follower means about the lock ring. Thus, the cam ring is movable from the upper position of FIG. 2 to the lower position of FIG. 1 in order to force the lock ring from expanded to contracted position. Alternatively, the cam ring is raised from its lower position of FIG. 1 to its upper position of FIG. 2 in order to permit the lock ring to expand to its unstressed position. When in its unstressed position, the lock ring will hold the cam ring in its upper position, whereby it remains in its expanded position as the upper wellhead member is lowered into or raised from end-to-end relation with the lower wellhead member 13.

As shown, the cam ring and follower means on the lock ring include axially successive, radially displaced cam and follower surfaces 23A and 20A which are connected to one another by a tapered transition. In the upper position of the cam ring, its lower cam surface is engaged with the upper follower surface of the lock ring, and its transition is spaced somewhat above the upper end of the lock ring. As the cam ring moves downwardly, the transition on the cam means moves over the upper end of the lock ring and the lower end of the cam ring moves downwardly against the transition on the lock ring to move the lock ring inwardly toward its contracted position at a relatively high rate. The upper and lower cam surfaces then move into sliding engagement with the upper and lower follower surfaces, respectively, of the lock ring so as to continue to move the lock ring into locking engagement with the tubular members at a relatively slow rate. As will be appreciated, this construction enables the lock ring to be moved between its alternate positions with a minimum stroke of the cam ring, and then the overall connector to be relatively short. Also, and as previously mentioned, the taper of the cam and follower surfaces 23A and 20AA, respectively, with respect to the vertical is less than the friction angle between them.

The cam and follower surfaces are disposed at an angle to the vertical which is less than the friction angle therebetween, so that, when moved to its lower position, the cam ring will not be accidentally raised and thus will maintain the tubular members connected to one another upon exhaustion of fluid pressure from the actuators.

A dog or key 24 is carried by the cam ring near its lower end for movement upwardly between the split ends 20A of the lock ring, as shown in FIG. 2A, as the cam ring moves into its upper position. In this way, the cam ring is able to positively expand the lock ring in the event its locking teeth are otherwise stuck to the locking grooves in the tubular members. The ends of the split ring are recessed at 20B so as to permit the dog or key to move freely therebetween without interfering with contraction of the split ends 20A as the cam ring moves downwardly to the position of FIG. 1A. As previously mentioned, detent means D on the dog and split ends 20A releasably retain the dog in the FIG. 2A position.

In an alternative embodiment of the invention, the lock ring 20, when unstressed, will assume its contracted, locking position. Thus, when cam ring 23 is in its raised position, as shown in FIG. 2, dog 24 is disposed between the ends 20A of the lock ring to hold it in its expanded position. Then, as the cam ring is lowered, dog 24 moves into recessed portions 20B, as shown in FIG. 1A, to permit the lock ring to contract into interlocking relation with the teeth, and the cam ring to wedge the lock ring radially inwardly to preload the connection. Then, upon lifting of the cam ring, dog 24 is moved back between the split ends of the lock ring to move it to and hold it in its expanded, unlocking position.

The inner diameter of the flange 28 of skirt 25 is adapted to fit closely about the tubular member 13, and thus to guide the upper tubular member for movement coaxially with respect to the lower tubular member as it is moved into end-to-end relation with the lower tubular member. More particularly, a tapered surface 29 is formed on the bottom of the flange adjacent to its inner diameter to guide the lower end of the upper tubular member into a coaxial position with respect to the upper end of the lower tubular member.

As previously mentioned, remotely operable, extendable and retractable actuators are connected at their opposite ends to the skirt and to the cam ring so as to selectively move the cam ring between its upper and lower positions. For this purpose, openings are formed in the skirt outwardly of the cam ring 23, each to receive a liner 30 for a cylinder having its opposite ends closed. As shown, there are several such actuators, and thus cylinders, each spaced circumferentially from the other. A piston 31 reciprocable in each cylinder has a rod 32 thereon which extends through the upper end of the cylinder for connection with annular plate 33 attached to the outer side of the cam ring. Thus, the cam ring may be moved to its upper position by extension of the actuators, and may be lowered by retraction of the actuators. As shown in FIGS. 2 and 3, ports are provided through the skirt to connect with the cylinder above and below the pistons 31, so as to alternately supply hydraulic fluid to or exhaust hydraulic fluid from opposite sides of the piston.

In the other embodiment of the invention, wherein the lock ring normally assumes a contracted position in locking engagement with the tubular members, the cam ring will not engage the follower means on the lock ring until the last stage of its downward movement, during which it will wedge the grooves on the locking ring over the teeth about the tubular members to preload the connection. On the other hand, when the cam ring is raised, the dog carried thereby will initially spread the ends of the contracted ring apart, and then hold the lock ring in expanded position when the cam ring has been lifted to its upper position. The lock ring and cam ring will be held in this latter position by the tight engagement of the split ends of the lock ring with the sides of the dog, as well as by detent means D on the dog engageable with the split ends as the dog moves upwardly between the split ends.

Although the actuators may be of other types, they are preferably of a fluid-operated type to which pressure fluid may be supplied from a source on board the vessel, or from which such pressure may be exhausted back to the source. Since in both embodiments of the invention, the lock ring will remain in the position into which it is moved, pressure fluid may be exhausted from the actuators until such time that it was desired to move the lock ring back to its other position.

In the alternative embodiment illustrated in FIGS. 4 and 5, segments or jaws 37 are mounted in circumferentially spaced apart relation about the lock ring 36, and having upper and lower locking teeth 38 and 39 formed thereon for locking engagement respectively with the locking grooves 14 and 15 of the upper and lower tubular members. The outer side of the lock ring 36 has axially successive, radially displaced follower surfaces connected by a tapered transition. Thus, as will be understood, the lock ring 36 may be used interchangeably with the lock ring 20, and would, when so interchanged, function and cooperate with the remaining parts of connector in the same manner as the lock ring 20.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

Inasmuch as many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A remotely operable, subsea wellhead connector, comprising a first tubular member adapted to be connected to the upper end of a first wellhead member mounted in an upright position beneath the water surface, a second tubular member adapted to be connected to the lower end of a second wellhead member so that it may be lowered therewith into end-to-end relation with the first tubular member, said first tubular member having first locking grooves thereabout, said second tubular member having second locking grooves thereabout, a split lock ring having first and second axially spaced locking teeth which are carried by the second tubular member for radial movement together between expanded positions in which the second teeth are generally opposite and spaced from the second grooves and in which the first teeth may be moved past the end of the first tubular member for disposal opposite and spaced from the first grooves, when said second member is lowered into end-to-end relation with the first member, and contracted positions in which the first and second teeth are in locking engagement with the first and second grooves, respectively, said teeth having tapered surfaces thereon which are slidable over tapered surfaces of the grooves to urge end surfaces on said members into tight engagement with one another as the lock ring moves to contracted position, a cam ring arranged about the lock ring for movement between a first position in which the lock ring is expanded and a second position in which the cam ring is slidable over follower means on the lock ring to wedge said lock ring into contracted position, a plurality of remotely operable, extendible and retractible actuators arranged about the cam ring, and means connecting opposite ends of the actuators to the second tubular member and the cam ring for moving said cam ring between said positions.

2. A connector of the character defined in claim 1, including a skirt carried by the second tubular member to surround the actuators and having an inwardly extending flange on its lower end, and bearing plate means extending laterally from the cam ring, the opposite ends of the actuators being connected to the flange and bearing plate means.

3. A connector of the character defined in claim 2, wherein the inner diameter of the skirt flange is adapted to fit closely about the first tubular member, and the bottom side of the flange has a tapered surface adjacent its inner diameter in order to guide the lower end of the second tubular member into end-to-end relation with the first tubular member.

4. A connector of the character defined in claim 1, wherein the lock ring assumes its expanded position when unstressed, and, when so expanded, supports the cam ring in its first position, and said cam ring is slidable over the follower means on the lock ring to force it inwardly from its expanded to its contracted position as the cam ring moves from its first to its second position.

5. A connector of the character defined in claim 4, including a dog on the cam ring which enters the split between the ends of the split ring to spread them apart as the cam ring moves into its first position.

6. A connector of the character defined in claim 5, wherein the dog and lock ring have detent means to releasably retain the dog in spreading position.

7. A connector of the character defined in claim 1, wherein the lock ring assumes its contracted position when unstressed, and said cam ring has means thereon for expanding the lock ring as the cam ring moves to its first position.

8. A connector of the character defined in claim 7, wherein the means on the cam ring for expanding the lock ring comprises a dog which enters the split between the ends of the lock ring to hold them apart.

9. A connector of the character defined in claim 8, wherein the dog and lock ring have detent means to releasably retain the dog in holding position.

10. A connector of the character defined in claim 1, wherein the follower means and cam ring include axially successive, radially displaced follower and cam surfaces, respectively, and tapered transitions between the successive surfaces.

11. A connector of the character defined in claim 1, wherein the cam ring and follower means extend at angles with respect to the axis of the lock ring which is less than the friction angle between them.

12. A connector of the character defined in claim 1, wherein the teeth are formed on the inner surface of the lock ring.

13. A connector of the character defined in claim 1, wherein the locking teeth are formed on jaws which are mounted about the inner side of the lock ring.

14. A remotely operable, subsea wellhead connector for connecting the lower end of one wellhead member to the upper end of another wellhead member which is mounted in an upright position beneath the water surface and which has locking grooves thereabout, said connector comprising a tubular member which is adapted to be connected to the lower end of the one wellhead member so that it may be lowered therewith into end-to-end relation with the lower wellhead member, said tubular member having locking grooves thereabout, a split lock ring having upper and lower axially spaced locking teeth which are carried by the tubular member for radial movement together between expanded positions in which the upper teeth are generally opposite and spaced from the grooves about the tubular member and in which the lower teeth may be moved past the upper end of the lower wellhead member for disposal opposite and spaced from the grooves thereabout, when said tubular member is lowered into end-to-end relation with the lower wellhead member, and contracted positions in which the upper and lower teeth are in locking engagement with the grooves in the tubular member and lower wellhead member, respectively, said teeth having tapered surfaces thereon which are slidable over tapered surfaces of the grooves to urge an end surface of said tubular member into tight engagement with an end surface of the lower wellhead member as the lock ring moves to contracted position, a cam ring arranged about the lock ring for movement between a first position in which the lock ring is expanded and a second position in which the cam ring is slidable over the follower means on the lock ring to wedge said lock ring into contracted position, a plurality of remotely operable, extendible and retractible actuators arranged about the cam ring, and means connecting opposite ends of the actuators to the tubular member and the cam ring for moving said cam ring between said positions.

15. A connector of the character defined in claim 14, including a skirt carried by the tubular member to surround the actuators and having an inwardly extending flange on its lower end, and bearing plate means extending laterally from the cam ring, the opposite ends of the actuators being connected to the flange and bearing plate means.

16. A connector of the character defined in claim 15, wherein the inner diameter of the skirt flange is adapted to fit closely about the lower wellhead member, and the bottom side of the flange has a tapered surface adjacent its inner diameter in order to guide the lower end of the tubular member into end-to-end relation with the upper end of the wellhead member.

17. A connector of the character defined in claim 14, wherein the lock ring assumes its expanded position when unstressed, and, when so expanded, supports the cam ring in its first position, and said cam ring is slidable over the follower means on the lock ring to force it inwardly from its expanded to its contracted position as the cam ring moves from its first to its second position.

18. A connector of the character defined in claim 17, including a dog on the cam ring which enters the split between the ends of the lock ring to spread them apart as the cam ring moves into its first position.

19. A connector of the character defined in claim 18, wherein the dog and lock ring have detent means to releasably retain the dog in spreading position.

20. A connector of the character defined in claim 14, wherein the lock ring assumes its contracted position when unstressed, and said cam ring has means thereon for expanding the lock ring as the cam ring moves to its first position.

21. A connector of the character defined in claim 20, wherein the means on the cam ring for expanding the lock ring comprises a dog which enters the split between the ends of the lock ring to hold them apart.

22. A connector of the character defined in claim 21, wherein the dog and lock ring have detent means to releasably retain the dog in holding position.

23. A connector of the character defined in claim 14, wherein the follower means and cam ring include axially successive, radially displaced follower and cam surfaces, respectively, and tapered transitions between the successive surfaces.

24. A connector of the character defined in claim 14, wherein the cam ring and follower means extend at angles with respect to the axis of the lock ring which is less than the friction angle between them.

25. A connector of the character defined in claim 14, wherein the teeth are formed on the inner surface of the lock ring.

26. A connector of the character defined in claim 14, wherein the teeth are formed on jaws which are mounted about the inner side of the lock ring.

27. A remotely operable, subsea wellhead connector, comprising a first tubular member adapted to be connected to the upper end of a first wellhead member mounted in an upright position beneath the water surface, a second tubular member adapted to be connected to the lower end of a second wellhead member so that it may be lowered therewith into end-to-end relation with the first tubular member, said first tubular member having first locking grooves thereabout, said second tubular member having second locking grooves thereabout, a split lock ring having first and second axially spaced locking teeth which are carried by the second tubular member for radial movement together between expanded positions in which the second teeth are generally opposite and spaced from the second grooves and in which the first teeth may be moved past the end of the first tubular member for disposal opposite and spaced from the first grooves, when said second member is lowered into end-to-end relation with the first member, and contracted positions in which the first and second teeth are in locking engagement with the first and second grooves, respectively, said teeth having tapered surfaces thereon which are slidable over tapered surfaces of the grooves to urge end surfaces on said members into tight engagement with one another as the lock ring moves to contracted positions, said lock ring assuming its contracted position, when unstressed, and a cam ring arranged about the lock ring for movement between a first position in which the lock ring is expanded and a second position in which the cam ring is contracted, said cam ring having a dog carried thereon which enters the split between the ends of the lock ring to spread apart, and thereby hold the lock ring in its expanded position, as the cam ring moves into its first position.

28. A connector of the character defined in claim 27, wherein the dog and lock ring have detent means engageable to releaseably retain the dog in holding position as the cam ring moves into its first position.

29. A connector of the character defined in claim 27, wherein the follower means and cam ring include axially successive, radially displaced surfaces.

30. A connector of the character defined in claim 27, wherein the taper between the cam ring and follower means is less than the friction angle so that the lock ring is normally held in its contracted position.

31. A connector of the character defined in claim 27, including a skirt carried by the second member to surrounding the lock ring and cam ring, and having an inwardly extending flange on which the lock ring is supported for radial movement.

32. A remotely operable, subsea wellhead connector for connecting the lower end of one wellhead member to the upper end of another wellhead member which is mounted in an upright position beneath the water surface and which has locking grooves thereabout, said connector comprising a tubular member which is adapted to be connected to the lower end of the one wellhead member so that it may be lowered therewith into end-to-end relation with the lower wellhead member, said tubular member having locking grooves thereabout, a split lock ring having upper and lower axially spaced locking teeth which are carried by the tubular member for radial movement together between expanded positions in which the upper teeth are generally opposite and spaced from the grooves about the tubular member and in which the lower teeth may be moved past the upper end of the lower wellhead member for disposal opposite and spaced from the grooves thereabout, when said tubular member is lowered into end-to-end relation with the lower wellhead member, and contracted positions in which the upper and lower teeth are in locking engagement with the grooves in the tubular member and lower wellhead member, respectively, said teeth having tapered surfaces thereon which are slidable over tapered surfaces of the grooves to urge an end surface of said tubular member into tight engagement with an end surface of the lower wellhead member as the lock ring moves to contracted position, said lock ring assuming its contracted position, when unstressed, and a cam ring arranged about the lock ring for movement between a first position in which the lock ring is expanded and a second position in which the cam ring is contracted, said cam ring having a dog carried thereon which enters the split between the ends of the lock ring to spread apart, and thereby maintain the lock ring in its expanded position, as the cam ring moves into its first position, a plurality of remotely operable, extendible and retractible actuators arranged about the cam ring, and means connecting opposite ends of the actuators to the tubular member and the cam ring for moving said cam ring between said positions.

33. A connector of the character defined in claim 32, wherein the dog and lock ring have detent means engageable to releaseably refain the dog in holding Position as the cam ring moves into its first position.

34. A connector of the character defined in claim 32, wherein the follower means and cam ring include axially successive, radially displaced surfaces.

35. A connector of the character defined in claim 32, wherein the taper between the cam ring and follower means is less than the friction angle so that the lock ring is normally held in its contracted position.

36. A connector of the character defined in claim 32, including a skirt carried by the tubular member to surround the lock ring and cam ring, and having an inwardly extending flange on which the lock ring is supported for radial movement.

37. A connector of the character defined in claim 36, wherein the inner diameter of the flange is adapted to fit closely about the upright wellhead member, and the flange has a tapered surface adjacent its inner diameter to guide the skirt over the end of the upright well head member.

* * * * *